(12) United States Patent
Iagnemma et al.

(10) Patent No.: US 10,244,094 B2
(45) Date of Patent: Mar. 26, 2019

(54) HAILING A VEHICLE

(71) Applicant: nuTonomy Inc., Cambridge, MA (US)

(72) Inventors: Karl Iagnemma, Belmont, MA (US); Philipp Robbel, Cambridge, MA (US)

(73) Assignee: nuTonomy Inc., Boston, MA (US)

( * ) Notice: Subject to any disclaimer, the term of this patent is extended or adjusted under 35 U.S.C. 154(b) by 14 days.

(21) Appl. No.: 15/240,072

(22) Filed: Aug. 18, 2016

(65) Prior Publication Data

US 2018/0053412 A1 Feb. 22, 2018

(51) Int. Cl.
*G08G 1/09* (2006.01)
*H04M 1/725* (2006.01)
*G05D 1/00* (2006.01)
*G06K 9/00* (2006.01)
*G08G 1/005* (2006.01)
*G08G 1/00* (2006.01)

(52) U.S. Cl.
CPC ...... *H04M 1/72522* (2013.01); *G05D 1/0088* (2013.01); *G06K 9/00791* (2013.01); *G08G 1/005* (2013.01); *G08G 1/202* (2013.01)

(58) Field of Classification Search
CPC ... G08G 1/09; H04M 1/72522; G05D 1/0088; G05D 1/0212; G05D 2201/0213; G05D 2201/0212
See application file for complete search history.

(56) References Cited

U.S. PATENT DOCUMENTS

| | | | |
|---|---|---|---|
| 5,166,668 A | 11/1992 | Aoyagi | |
| 6,151,539 A | 11/2000 | Bergholz et al. | |
| 8,437,890 B2 | 5/2013 | Anderson et al. | |
| 8,543,261 B2 | 9/2013 | Anderson et al. | |
| 8,676,427 B1 | 3/2014 | Ferguson et al. | |
| 8,744,648 B2 | 6/2014 | Anderson et al. | |
| 9,097,549 B1 | 8/2015 | Rao et al. | |
| 9,120,485 B1 | 9/2015 | Dolgov | |
| 9,412,280 B1* | 8/2016 | Zwillinger | G08G 5/0069 |
| 2009/0177502 A1 | 7/2009 | Doinoff et al. | |
| 2010/0228427 A1 | 9/2010 | Anderson et al. | |
| 2013/0085817 A1 | 4/2013 | Pinkus | |
| 2014/0067488 A1* | 3/2014 | James | G06Q 30/02 705/13 |
| 2014/0136414 A1* | 5/2014 | Abhyanker | G06Q 50/28 705/44 |
| 2014/0303827 A1* | 10/2014 | Dolgov | B60W 30/00 701/23 |

(Continued)

FOREIGN PATENT DOCUMENTS

| | | |
|---|---|---|
| WO | WO2014/139821 | 9/2014 |
| WO | WO2015/008032 | 1/2015 |

OTHER PUBLICATIONS

Transaction history and application as filed of U.S. Appl. No. 15/240,150, filed Aug. 18, 2016.

'fastcompany.com' [online]. "Why Your Autonomous Car Might Come With Its Own Drone," Published on May 2, 2018, [retrieved on Oct. 20, 2018], retrieved from the Internet: URL:<https://www.fastcompany.com/90162582/why-your-autonomous-car-might-come-with-its-own-drone>. 7 pages.

(Continued)

*Primary Examiner* — Thomas D Alunkal
(74) *Attorney, Agent, or Firm* — Fish & Richardson P.C.

(57) ABSTRACT

In general, an indication is received through a user interface of an intention of a potential rider to use an autonomous vehicle. In response to the receipt of the indication, a hailing request is sent by a signaling mode to at least one autonomous vehicle that can receive the hailing request directly in accordance with the signaling mode.

13 Claims, 9 Drawing Sheets

(56) References Cited

U.S. PATENT DOCUMENTS

| | | |
|---|---|---|
| 2015/0292894 A1 | 10/2015 | Goddard et al. |
| 2015/0339928 A1* | 11/2015 | Ramanujam ............ G08G 1/202 701/23 |
| 2015/0345966 A1* | 12/2015 | Meuleau ............. G01C 21/3453 701/23 |
| 2015/0345971 A1 | 12/2015 | Meuleau et al. |
| 2015/0346727 A1* | 12/2015 | Ramanujam ....... B62D 15/0285 701/23 |
| 2015/0348112 A1* | 12/2015 | Ramanujam ....... G06Q 30/0266 705/14.63 |
| 2016/0075333 A1 | 3/2016 | Sujan et al. |
| 2016/0139600 A1 | 5/2016 | Delp |
| 2016/0161266 A1* | 6/2016 | Crawford ............... G01C 21/34 701/25 |

OTHER PUBLICATIONS

Florentine et al., "Pedestrian notification methods in autonomous vehicles for multi-class mobility-on-demand service." InProceedings of the Fourth International Conference on Human Agent Interaction, Oct. 4, 2016, pp. 387-392.
International Preliminary Report on Patentability in International Application No. PCT/US2017/47433, dated Oct. 2, 2018, 13 pages.
International Search Report and Written Opinion in International Application No. PCT/US2017/47433, dated Oct. 30, 2017, 20 pages.
Pendleton et al., "Autonomous golf cars for public trial of mobility-on-demand service." InIntelligent Robots and Systems (IROS), 2015 IEEE/RSJ International Conference on Sep. 28, 2018, pp. 1164-1171.

\* cited by examiner

SOFTWARE PROCESSOR, 300
    GEOMETRIC ELEMENTS, 302
    BLACK-AND WHITE, GRAYSCALE, COLOR, 304
    TEXTURE, 306
    ENCODING, 308
    LIGHT MOODULATION, 310
    SOUND MODULATION, 312
    COMMUNICATION, 314

FIG. 13

US 10,244,094 B2

HAILING A VEHICLE

BACKGROUND

This description relates to hailing a vehicle such as an autonomous vehicle.

Figure 1:

As shown in FIG. 1, in a common method for a person 10 to hail a vehicle such as a taxicab or a ride-sharing vehicle, the person enters a request by interacting with a mobile app. The request is processed by the mobile app and then forwarded through the cellular telephone network or the Internet to a central server 12 where it is processed and then forwarded through the cellular telephone network to a driver of the vehicle 14.

SUMMARY

In general, in an aspect, an indication is received through a user interface of an intention of a potential rider to use an autonomous vehicle. In response to the receipt of the indication, a hailing request is sent by a signaling mode to one or more autonomous vehicles that can receive the hailing request directly in accordance with the signaling mode.

Implementations may include one or a combination of two or more of the following features. The user interface is presented through the display of a mobile device. The indication is received through an input feature of a mobile device. The indication is received through an input feature of a device in a fixed location. The hailing request is sent from a mobile device. The hailing request is sent from a device in a fixed location. The hailing request is sent by a combination of two or more signaling modes. The signaling mode includes a visual mode. The visual mode includes a display of graphical elements. The visual mode includes an emitting of light. The signaling mode includes an audible mode. The audible mode includes a sound. The audible mode includes an utterance. The hailing request is configured to include hailing information related to the intended use of the autonomous vehicle. The hailing information includes a destination location. The hailing information includes a class or type of service. The type of service could be the use by a potential rider. The type of service could be the use for a parcel delivery. The hailing information includes a number of passengers. The hailing information includes information about the potential rider or parcel to be delivered. The hailing information includes a priority of service. A receipt confirmation is received from the autonomous vehicle. In response to receiving the receipt confirmation, a hailing confirmation is sent to the autonomous vehicle.

In general, in an aspect, a hailing request carried by a signaling mode is received directly at a receiving device of an autonomous vehicle. The hailing request corresponds to an indication of an intention of the potential rider to use an autonomous vehicle. The hailing request is processed at the autonomous vehicle to determine whether to respond to the hailing request.

Implementations may include one or a combination of two or more of the following features. The hailing request is received by direct wireless communication. The hailing request is received from a mobile device. The hailing request is received from a device in a fixed location. The hailing request is received from or on behalf of the potential rider. The hailing request is received by a combination of two or more signaling modes. The signaling mode includes a visual mode. The visual mode includes a display of graphical elements. The visual mode includes an image or light. The signaling mode includes an audible mode. The audible mode includes a sound. The audible mode includes an utterance. The signaling mode includes a human gesture or facial expression or both. The hailing request includes hailing information related to the use of the autonomous vehicle. The hailing information includes a destination location. The hailing information includes a class or type or priority of service. The hailing information includes a number of passengers. The hailing information includes information about the potential rider or parcel to be delivered. A receipt confirmation is sent from the autonomous vehicle. A hailing confirmation is received after the receipt confirmation has been sent.

In general, in an aspect, there is a device for hailing an autonomous vehicle. The device includes an input feature to receive an indication of an intention of a potential rider to use the autonomous vehicle. The device also includes an output feature to send a hailing request by a signaling mode to at least one autonomous vehicle that can receive the hailing request directly in accordance with the signaling mode.

Implementations may include one or a combination of two or more of the following features. The device includes a mobile device. The device is fixed in a location. The input feature includes a touch-sensitive display. The input feature includes a microphone. The input feature includes a button. The hailing request carries hailing information related to the use of the autonomous vehicle and the device includes a processor to embed at least some of the hailing information in the hailing request. The hailing information includes a destination location. The hailing information includes a class or type or priority of service. The hailing information includes a number of passengers. The hailing information includes information about the potential rider or parcel to be delivered. The output feature includes a transmitter. The output feature includes a display. The output feature includes a light emitter. The output feature includes a sound emitter. The signaling mode includes a visual mode. The visual mode includes a display of graphical elements. The visual mode includes an image or light. The signaling mode includes an audible mode. The audible mode includes a sound. The audible mode includes an utterance. The signaling mode includes a human gesture or facial expression or both. The hailing request is sent by a combination of two or more signaling modes, The device includes a receiver feature to receive a receipt confirmation from the autonomous vehicle after the hailing request has been sent.

In general, in an aspect, a device for use at an autonomous vehicle includes a receiving feature to receive a hailing request. The hailing request corresponds to an indicated intention of a potential rider to use the autonomous vehicle. The hailing request is received directly in accordance with a signaling mode from a device in the vicinity of the potential rider. The device includes a processor to process the hailing request.

Implementations may include one or a combination of two or more of the following features. The hailing request carries hailing information related to the use of the autonomous vehicle and the device includes a processor to embed at least some of the hailing information in the hailing request. The hailing information includes a destination location. The hailing information includes a class or type of service. The hailing information includes a number of passengers. The hailing information includes information about the potential rider or parcel to be delivered. The receiving feature includes a camera. The receiving feature includes a light detector. The receiving feature includes a microphone. The signaling mode includes a visual mode. The visual mode includes a display of graphical elements. The visual mode includes an image or light. The signaling mode includes an audible mode. The audible mode includes a sound. The audible mode includes an utterance. The signaling mode includes a human gesture or facial expression or both. The hailing request is received by a combination of two or more signaling modes. The processor includes a process to determine an action based on the hailing request. The action includes accepting the hailing request. The action includes rejecting the hailing request. The action includes providing a pickup location to autonomous driving features of the autonomous vehicle. A hailing confirmation is received at the device at the autonomous vehicle.

In general, in an aspect, an autonomous vehicle includes a processor and software to be executed by the processor to cause the autonomous vehicle to travel to an identified location. The autonomous vehicle also includes a device (a) to receive a hailing request, the hailing request corresponding to an indicated intention of a potential rider to use an autonomous vehicle, the hailing request being received directly in accordance with a signaling mode from a device in the vicinity of the potential rider, and (b) to provide a pickup location to the processor based on the hailing request.

These and other aspects, features, implementations, and advantages can be expressed as methods, apparatus, systems, components, program products, business methods, means or steps for performing functions, and in other ways.

These and other aspects, features, implementations, and advantages will become apparent from the following description and from the claims.

DESCRIPTION

Figure 2:
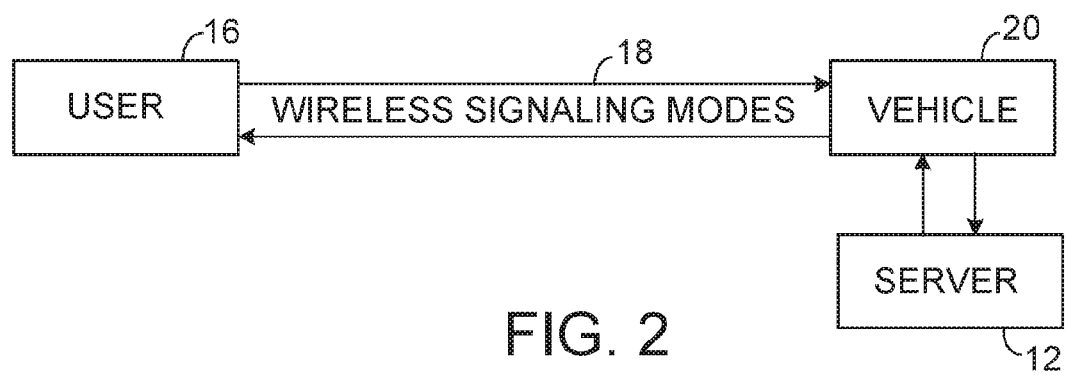
Figure 3:
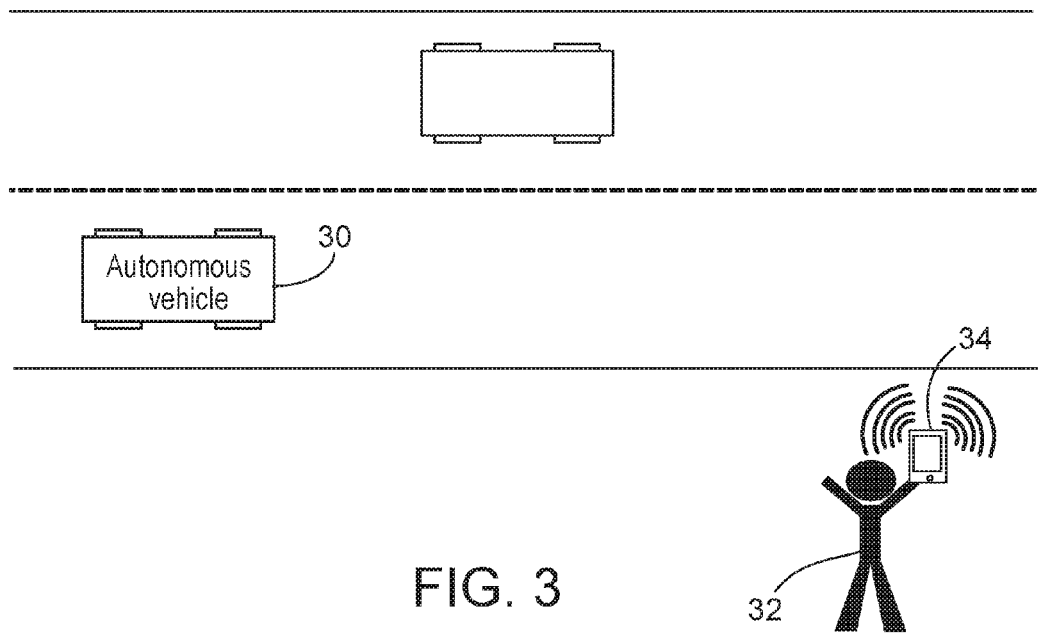
Figure 4:
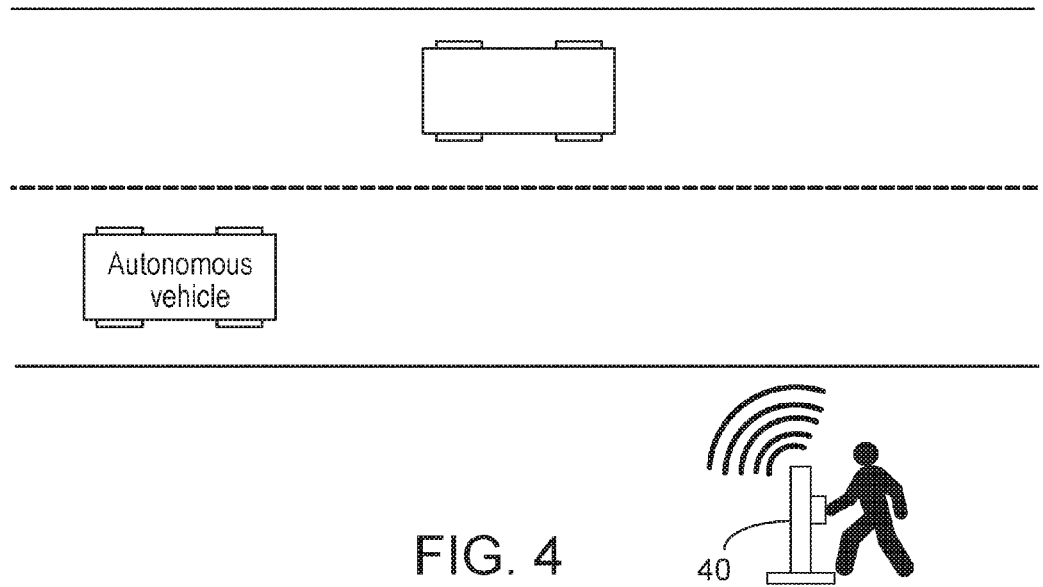
Figure 5:
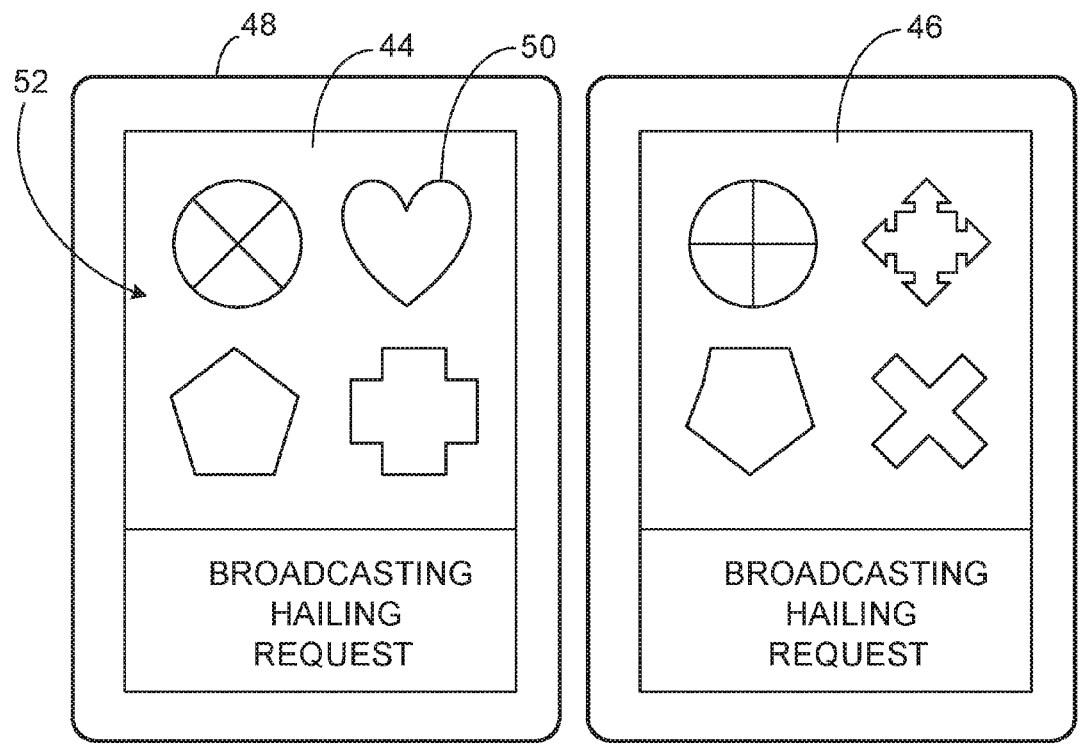
Figure 6:
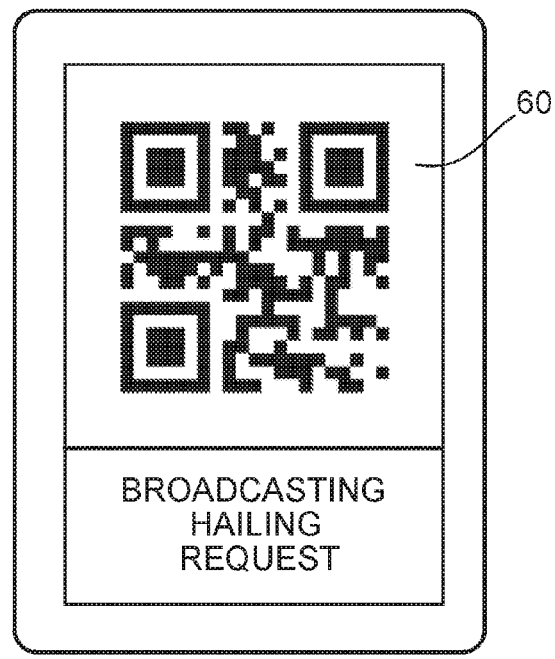
Figure 7:
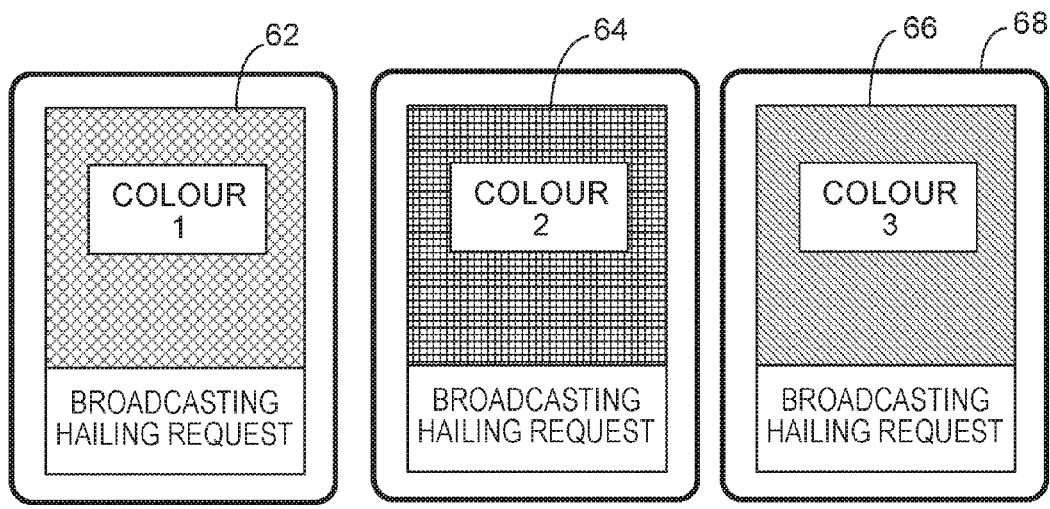
Figure 8:
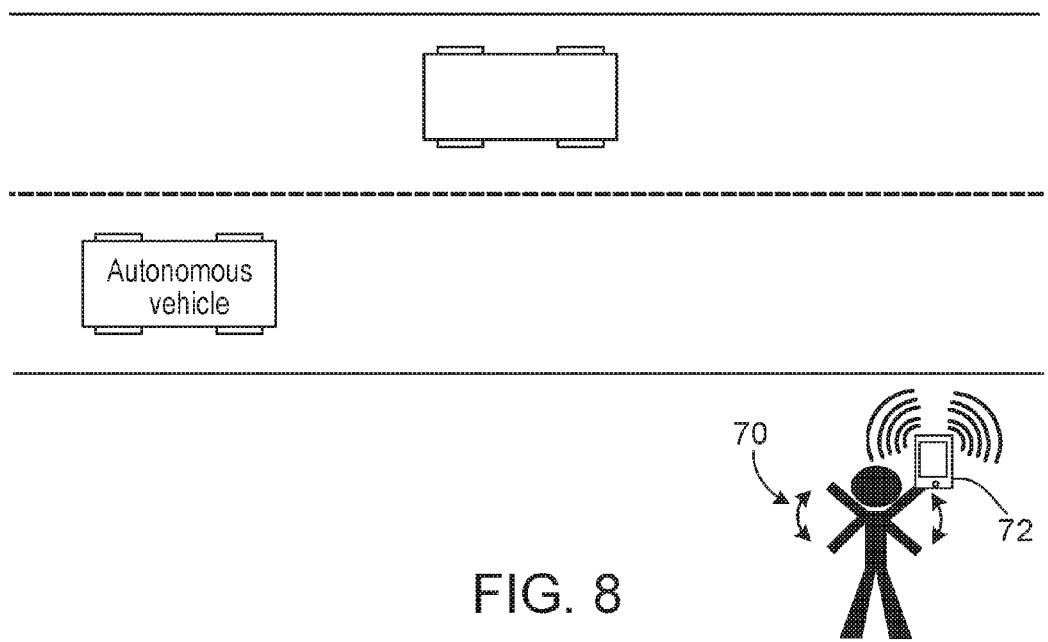
Figure 9:
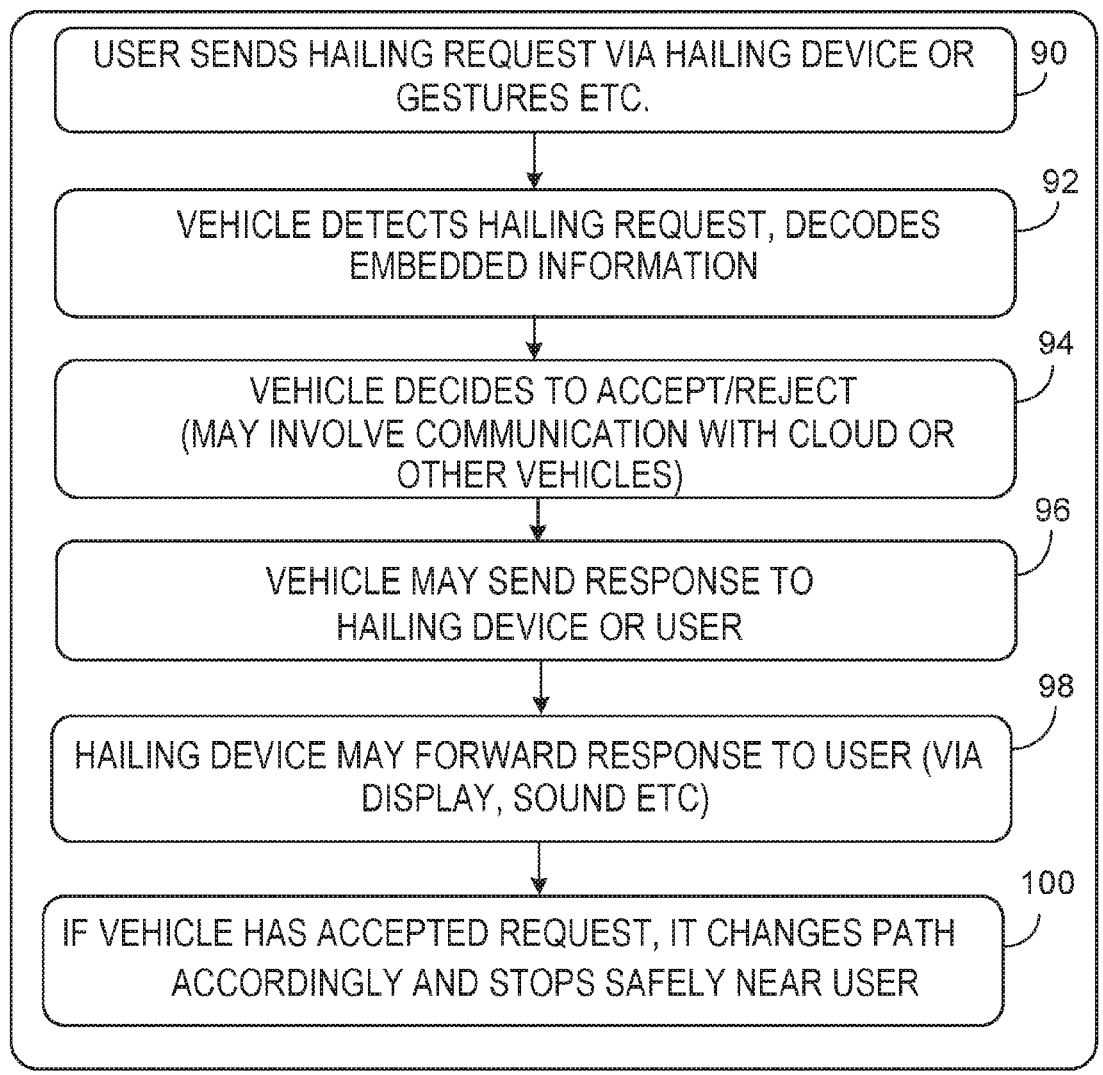
Figure 10:
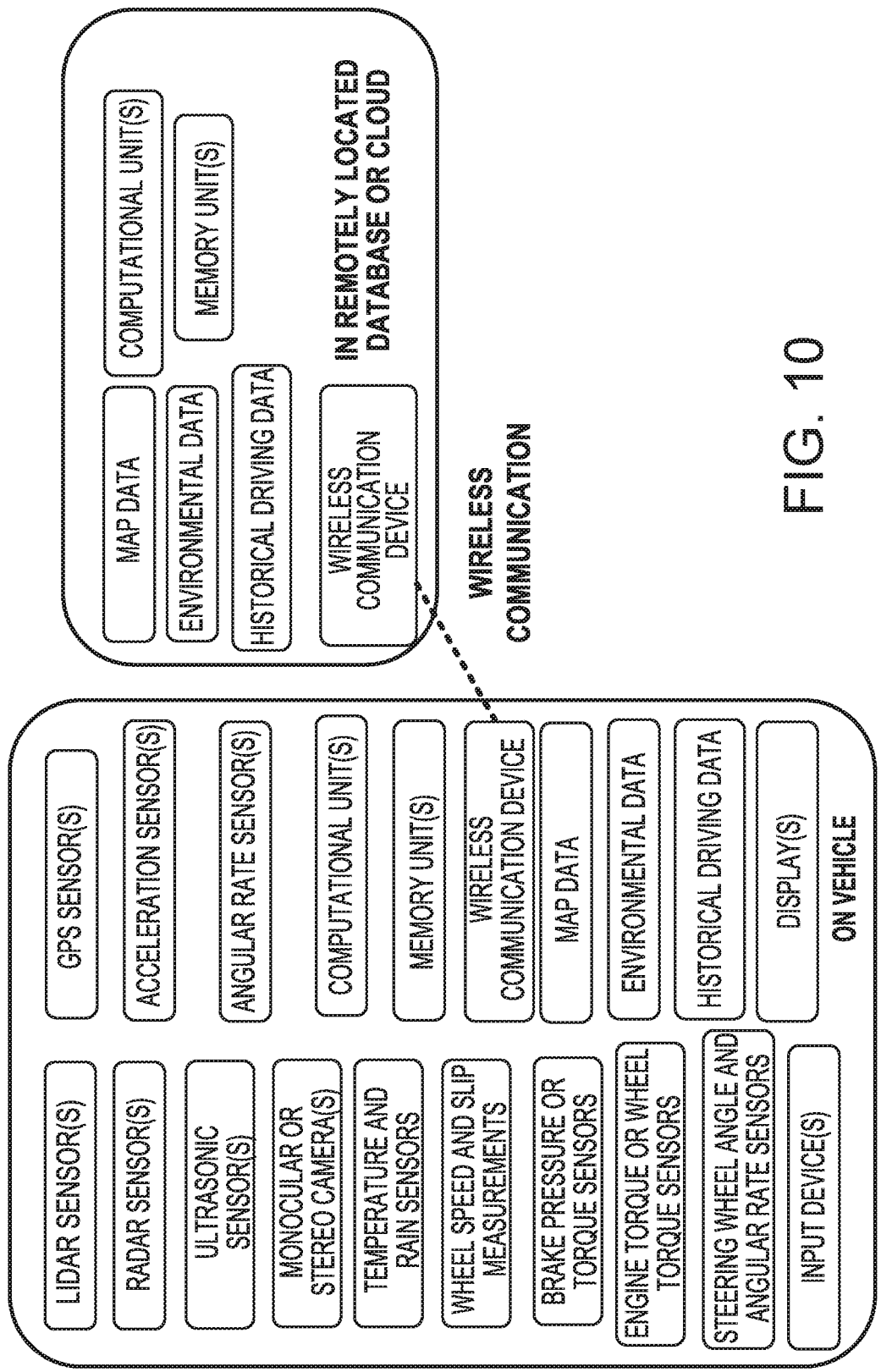
Figure 11:
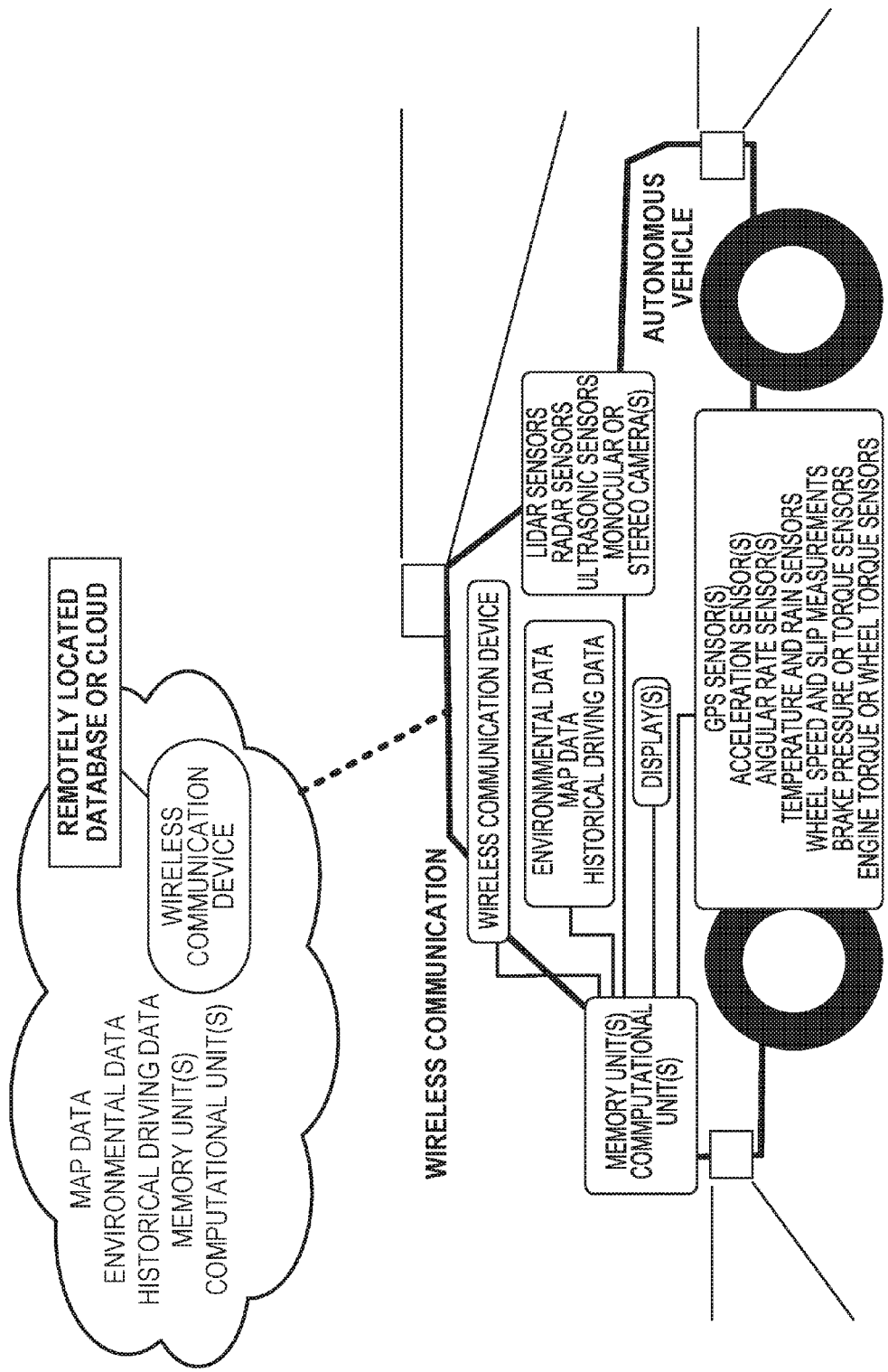
Figure 12:
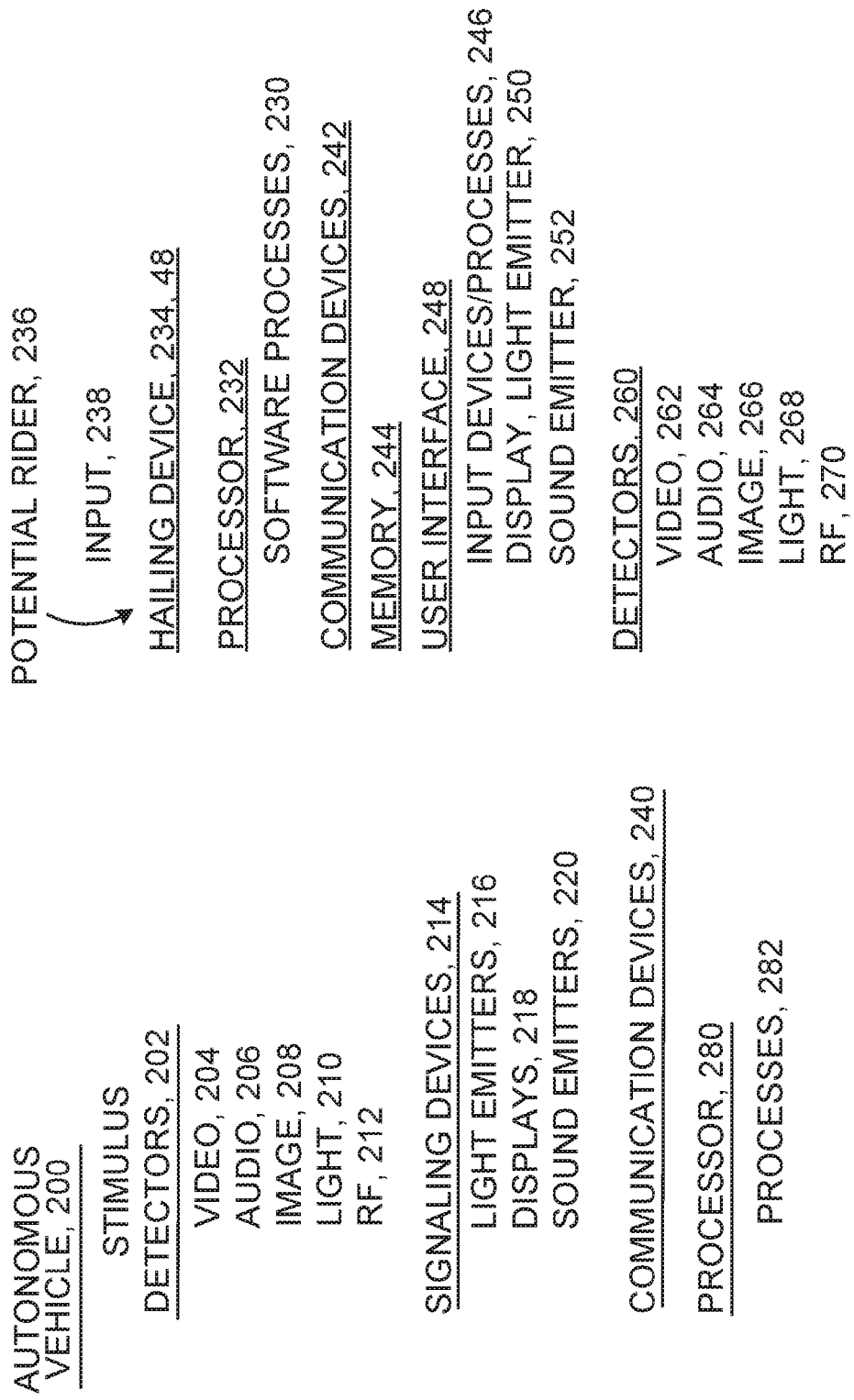

FIGS. 1, 2, 9, and 10 are block diagrams.
FIGS. 3, 4, and 8 are schematic views of vehicle hailing.
FIGS. 5, 6, and 7 are display screen shots.
FIG. 11 is a schematic diagram of a vehicle.
FIGS. 12 and 13 are schematic diagrams.

Here we describe a system and techniques for a person to use in hailing a vehicle, such as an autonomous vehicle. As shown in FIG. 2, in some implementations of the system and techniques that we describe here, a user 16 hails a vehicle 20 by communication that is achieved directly with the vehicle using one or more wireless signaling modes 18. In some cases, a server 12 can also or alternatively be in direct communication with the vehicle.

We sometimes refer to the system and techniques broadly as a "hailing system." We use the term "hailing" or "hail" broadly to include, for example, any action by any person in any context (for instance a pedestrian) to signal, call, flag down, alarm, or in any other way to attract the attention of a vehicle for the purpose of indicating the person's wish to ride in (alone or with others), hire for service, cause a delivery to be made by, or otherwise make use of the vehicle (such as an autonomous vehicle).

Hailing can be done by, through the medium of, or with the assistance of a hailing device. We use the phrase "hailing device" broadly to include, for example, any apparatus, equipment, instrument, or other device associated with hailing, for example, a phone or other handheld device, a smartwatch or bracelet or other wearable device, or a mounted or otherwise stationary device located on or near a sidewalk or road edge, to name only a few. We use the phrase "potential rider" broadly to include, for example, any person in any context who wishes to ride in (alone or with others), hire for service, cause a delivery to be made by, or otherwise make use of a vehicle (such as an autonomous vehicle). We use the term "hire a vehicle for service" broadly to include, for example, to obtain access in any way and in any context to a vehicle for the purpose of, for example, riding in the vehicle, causing a delivery to be made by the vehicle, or otherwise making use of the vehicle. Although we sometimes refer in our discussion to autonomous vehicles, the hailing system could also be used for semi-autonomous vehicles and in some contexts for other kinds of vehicles driven in other ways. We sometimes use the term "autonomous vehicle" to refer broadly to any such vehicle. An autonomous vehicle can be hailed when it is passing along a roadway nearby to a potential rider, or when it is stopped, or in other contexts.

An autonomous vehicle can drive safely without human intervention during part of a journey or an entire journey. As shown in FIGS. 10 and 11, an autonomous vehicle includes sensors, actuators, computers, and communication devices to enable automated generation and following of routes through the environment. Autonomous vehicles typically contain one or more video sensors, at least one of which is typically oriented in the forward direction in order to capture data related to the scene in front of the vehicle. Additionally, autonomous vehicles may contain one or more LIDAR sensors. Autonomous vehicles typically are equipped with a wireless two-way communication capability to access data and information stored on servers in a cloud service. As also shown in FIGS. 10 and 11, the autonomous vehicle can communicate wirelessly with a server at a central location.

These and other capabilities can enable the autonomous vehicle to react to detected visual or other physical features in the environment, including particular shapes, colors, textures, human gestures, and other visual stimuli. Autonomous vehicles may also be equipped with auditory sensors to capture and react to sounds in the environment, and horns, speakers, bells, or other noisemakers to emit sound. We will refer to these visual and auditory capabilities and devices and a broad range of other detection capabilities and devices by the general phrase "stimulus detectors."

Thus, as shown in FIG. 12, the stimulus detectors 202 of an autonomous vehicle 200 can include video 204, audio 206, image 208, light 210, RF 212, for example.

The autonomous vehicles used with the hailing system that we describe here may also be equipped with lights, display screens, light-emitting diodes, or other light emitting devices 216 mounted, for example, on the exterior of the vehicle such that they can be viewed from outside the vehicle. Autonomous vehicles may have displays 218, lights, sirens, klaxons, or other sound emitters 220, and other signaling devices mounted, for example, external to the vehicle. We will refer to these signaling devices and techniques and to a broad range of other signaling capabilities and equipment as "signaling devices." Often the signaling devices operate in modes that are perceptible by and understood by people.

Conventionally, vehicles (such as taxicabs and vehicles being driven by people for ride-hailing services) can be hired for service by a potential rider using a ride hailing software process 230 that may run on a processor unit 232 embedded within a smartphone, laptop, tablet, or other computing device 234. The potential rider 236 typically inputs 238 to the ride hailing software process a desired pick-up location and may also input a desired drop-off (i.e., a goal) location (e.g., a destination address or street intersection).

In known systems, the desired pick-up location is then communicated wirelessly to a centralized server tasked with assigning movement directions to one or more and potentially a large fleet (e.g., hundreds or thousands) of vehicles. The centralized server then runs a routing software process that provides by wireless communication to a particular vehicle the potential rider's pick-up location. The particular vehicle then is driven to the desired pick-up location to meet the potential rider. Once the potential rider enters the vehicle and completes an identification process (not necessarily in that order), the vehicle is considered hired for service and begins the journey to the desired drop-off location.

In some typical use cases of autonomous vehicles, the desired pick-up or goal location may be specified by an algorithm (which may be located on a centralized server in the cloud and tasked with optimizing the locations of a fleet of autonomous vehicles with a goal of minimizing rider wait times when hailing a vehicle), or may be provided by another process (e.g., an emergency process that identifies the nearest hospital as the goal position due to a detected medical emergency on board the vehicle).

In implementations of the hailing system that we describe here, a potential rider of a vehicle (e.g., an autonomous vehicle) may wish to hire a vehicle for service without, for example, inputting a desired pick-up location into a smartphone, laptop, tablet, or other computing device, but rather to simply hail the vehicle (such as an unoccupied autonomous vehicle passing on a roadway). The hailing system that we describe here can also apply to other scenarios, such as hailing an autonomous vehicle that is parked at a particular location.

As shown in FIG. 3, in implementations of our hailing system, hailing of an autonomous vehicle 30 can be accomplished by sending information from or on behalf of or in association with the potential rider 32 to the autonomous vehicle using one or a combination of two or more of a variety of signaling modes including those discussed below. We use the term "signaling mechanism" broadly to include, for example, any device, equipment, apparatus, or system by which information about the hailing can be sent to the autonomous vehicle. We use the term "signaling mode" broadly to include, for example, any form in which information can be sent by wireless signals or other methods, including non-electronic methods. Among others, the signaling mode can include displaying an image or sequence of images, emitting a sequence of light signals, emitting a sequence of sound signals, emitting a wireless communication signal, or engaging in gestures or facial expressions, to name a few.

In most cases, the information signaling mechanism and mode are designed to increase the incidence rate of true detections (i.e., scenarios in which the autonomous vehicle correctly identifies that a hailing request has been directed to the vehicle) and to reduce the incidence rate of false detections (i.e., scenarios in which an autonomous vehicle incorrectly identifies that a hailing request has been directed to the vehicle when none has been sent or one has been sent to another vehicle, for example).

As shown in FIG. 3, the potential rider 32 can signal the autonomous vehicle using a hailing device 34 such as a mobile device (or a wide variety of other devices).

In some instances, the hailing may be performed by a potential rider (or someone else, such as a companion) who is carrying a hailing device (e.g., a smartphone). In some cases (see FIG. 4), the hailing may be performed using a hailing device that is mounted or installed in a fixed location, such as on a structure at which vehicle hailing may commonly occur (e.g., outside a busy hotel). In some cases, the hailing device may be typical human capabilities performed by a potential rider (or someone on her behalf) who is not carrying any external hailing device, but rather uses other signaling mechanisms, such as a hand, or facial, or other gesture or whistling, yelling, or making another sound to transmit information. In some implementations, the hailing may be performed by interacting with a device attached to the autonomous vehicle itself (e.g., a smart card reader that can read the user's smart card or a smart device that can communicate with the user's smartphone.)

Hailing using the hailing system can be done in a way that complies with a predefined and commonly accepted hailing protocol that could cover the manner in which the signaling mechanism is to operate, the information that is to be transmitted, its format, and a wide variety of other aspects. A wide variety of entities that operate individual autonomous vehicles and fleets of them to be hired for service and entities that produce software, hardware, and other equipment for use in autonomous vehicles and hailing devices can subscribe to such a hailing protocol.

A desirable aspect of such a hailing protocol is that it may enable a potential rider to hail a vehicle more quickly (because vehicles of more than one fleet operator comply with the protocol) than would be achievable by hailing an autonomous vehicle that is operated by one specific fleet operator under a proprietary hailing method. Interoperability among fleet operators could also require a common central cloud or system that could broadcast the hailing requests to all fleet operators.

Another desirable aspect of the hailing system that we describe here is that the potential rider may be able to hail a vehicle more quickly than if the rider were required to input a desired pick-up location (which is not required in implementations of the hailing system), wait for the system to assign a vehicle to her, and then wait for that vehicle to arrive at the pickup location. Another desirable aspect of some implementations of the hailing system is that the potential rider may be able to hail a vehicle anonymously, e.g., without using a ride hailing software process that may be tied to a user account that includes personally identifying information. In other words, the potential rider need not say where she is headed or expose any of her personal information in the process of using the hailing system.

On the other hand, depending on the signaling mechanism, certain kinds of information associated with the hailing request can be transmitted to the autonomous vehicle by the hailing system. This information may include, but not be limited to, information about the number of passengers, the desired class or cost of service (which may be used to exclude vehicles of a certain size or class from responding to the hailing request), information about a priority or emergency hailing request, or personal identifying information about the rider, or a combination of any two of more of those, and of other information. Transmitted information may employ any of a number of possible encryption techniques.

The hailing device can include, for example, one or more of the following (and wide variety of others):

1. As shown in the example of FIG. 12, a smart phone, tablet, handheld PC, smartwatch, bracelet, or other wearable device or other configurable mobile device that is equipped with at least a processor 232, a memory unit 244, an input device or process 246 associated with a user interface 248, and (in some cases is equipped with) a display screen, light-emitting diode(s), luminescent material, e-ink screen, or other light emitting or light modulating media 250. Such display and light-emitting media may be able to exhibit or modulate sequences of images, colors, or lights or a combination of any two or more of them and other visual indications. The hailing device may be equipped with one or more video sensors 262 capable of detecting visual features in the environment. The device may be equipped with one or more microphones or speakers (or both) that enable the capability to detect and emit sound 264. The device may be equipped with wired or wireless receivers and transmitters that enable it to communicate with, among other things, a central cloud or servers 242.

2. A printed paper or card.

3. A whistle or other noisemaker, including programmable noisemakers equipped with at least a processor and speaker, and potentially a microphone.

Modes for Hailing an Autonomous Vehicle

Exemplary methods for hailing an autonomous vehicle include but are not limited to the following methods, which may be employed either independently or in combination.

Image Display

As shown in FIG. 5, hailing of an autonomous vehicle may be achieved by displaying a particular image or sequence of images 44, 46 (for example, displayed alternating at a fixed repeat rate) on a hailing device 48 (234 in FIG. 12) in a manner (e.g., presenting the device in an orientation such that the image or images are displayed toward the roadway at shoulder height or above) that is likely to lie within a visual line of sight of, for example, video sensors 204 mounted on a passing autonomous vehicles. For example, the hailing device can be located at a sidewalk or road edge, or at an intersection where the potential rider is standing.

The image or images to be displayed may exhibit one or a combination of any two or more of the following properties:

1. Geometric features 50 (e.g., image features constructed of geometric elements) or patterns of features 52 such as features that are not smaller than those that can reliably be resolved by an autonomous vehicle at a nominal hailing distance 1-30 meters) using, for example, a detection system based on vision sensor(s) 208 mounted on the vehicle and that have a typical field of view (e.g., 90 degrees horizontal× 60 degrees vertical) and resolution (e.g., 640 pixels horizontal×480 pixels vertical). As shown in FIG. 13, the software processes 300 running on the hailing device can include geometric element processes 302 to form and present the geometric features.

2. Formed in black-and-white (as in FIG. 5), grayscale, or color. Displaying a grayscale or color image rather than a black-and-white image may be advantageous because the grayscale and color image may contain more information than a black-and-white image and may therefore enable encoding of a greater amount of information related to the hailing request, or enable reduced incidence of false detections or both. Detection of color information contained in an image implicitly requires that autonomous vehicles be equipped with color video sensors. The software processes 300 running on the hailing device can include black-and-white, grayscale, and color processes 304 to produce the appropriate images.

3. Textures (e.g., arrangements of colors or intensities in a region of an image or the entire image) that can reliably be resolved by an autonomous vehicle at a nominal hailing distance using a detection system based on vision sensor(s) mounted on the vehicle and that have a typical field of view and resolution. The software processes 300 running on the hailing device can include texture generating processes 306.

4. The texture might include information that is encoded in a format (such as QR codes 60 as shown in FIG. 6, which encode information in a binary format). This allows for more information to be communicated to the vehicle. Additional information can be encoded in the hailing request by increasing the resolution of the format. The software processes 300 running on the hailing device can include encoding processes 308 for this purpose.

5. A sequence of colors 62, 64, 66 can be displayed by the hailing device at a fixed repeat rate, as shown in FIG. 7. FIG. 7 shows coloured light being emitted by a display screen 68 (250 in FIG. 12). Other light sources, such as LEDs, torches, and flashlights, to name a few, can be used. The emitted light can be in the visible spectrum or the invisible spectrum. The light could be of a single wavelength or contain multiple wavelengths. The pattern can be changed temporarily as can the intensity of the light. As discussed later, sounds can be used as the signaling mode, and the frequencies of the sound can be controlled similarly. Temporal and spectral control of the light can be handled by light modulation processes 310 running on the hailing device 300.

6. The appearance of the image should be uncommon in order to reduce the chance that a similar or identical image that is not produced by a hailing device is detected by sensors on an autonomous vehicle, thereby resulting in a false detection. For example, the image should not be similar to images that are commonly located on traffic signs or other common sidewalk features, such as news boxes, bus stop shelters, etc.

Information related to a hailing request (e.g., the desired class or cost of service, or the presence of a priority or emergency hailing request) may be encoded in the image by the encoding and light modulation processes 308 and 310 using various methods, including but not limited to the following individual methods, or combinations of these methods:

1. Varying image features, e.g., displaying a unique image or sequence of images depending on the information related to the hailing request. For example, a particular image may be displayed for a hailing request by a potential rider who is a single passenger for an autonomous vehicle offering a standard class of service, while another particular image may be displayed for a hailing request by a potential rider who represents two passengers for an autonomous vehicle offering a premium class of service.

2. Varying a sequence of images displayed, including varying the temporal properties of the sequence of images displayed. For example, a particular sequence of images may be displayed for a hailing request by a potential rider who is a single passenger for an autonomous vehicle offering a standard class of service, while another particular sequence of images may be displayed for a hailing request by a potential rider who represents two passengers for an autonomous vehicle offering a premium class of service. The temporal properties such as the display duration of each image may be modulated to encode additional information, or reduce incidence of false detections.

3. Varying the black-and-white, grayscale, or color properties of the image or sequence of images displayed, including varying the temporal properties of the color of the images. For example, a particular red image may be displayed for a hailing request by a potential rider who is a single passenger for an autonomous vehicle offering a standard class of service, while the same particular image may be displayed green for a hailing request by a potential rider represents a party of two passengers for an autonomous vehicle offering a premium class of service.

4. Varying the textural properties of an image or sequence of images displayed. For example, a particular black-and-white checkerboard image may be displayed for a hailing request by a potential rider who is a single passenger for an autonomous vehicle offering a standard class of service, while a particular green-and-yellow checkerboard image may be displayed for a hailing request by a potential rider who represents a party of two passengers for an autonomous vehicle offering a premium class of service.

5. The image to be displayed may be a company logo or other symbol that conveys an advertisement or promotional information. The advertisement may be for an autonomous vehicle company (e.g., a company that operates an autonomous vehicle that may respond to the hailing request) or another business entity.

Emitting Light

Hailing of an autonomous vehicle may be achieved by emitting light from a hailing device in a manner (e.g., presenting the device in an orientation such that the emitted light is directed toward the roadway at shoulder height or above) that is likely to lie within a visual line of sight of video sensors mounted on an autonomous vehicle (e.g., from a sidewalk or road edge, or by a potential rider who is standing at an intersection).

The emitted light to be displayed may exhibit one or a combination of two or more of the following properties based on execution of encoding and light modulation processes 308 and 310 on the hailing device 300:

1. The wavelength of the light may lie within the visible spectrum or, given sufficient emission capabilities of the hailing device, the near infrared spectrum or other spectrum provided that the wavelength can be detected by video sensors mounted on the autonomous vehicle.

2. The wavelength of the light in the visible spectrum may lie in bands associated with a particular color or many colors.

3. The wavelength of the light may be uniform or variable.

4. The wavelength of the light may be controllable or uncontrollable.

5. The intensity of the light may be uniform or variable. The light intensity should be reliably detectable by an autonomous vehicle at a nominal hailing distance using a detection system based on vision sensor(s) or light detection sensor(s) that have a typical detection sensitivity.

6. The intensity of the light may be controllable or uncontrollable.

7. The characteristics of the emitted light (e.g., the color, wavelength, intensity temporal frequency (i.e. blinking rate), or combinations of them) should be uncommon, in order to minimize the chance that emitted light having similar or identical characteristics is erroneously detected by sensors on an autonomous vehicle as a hailing request, thereby resulting in a false detection. For example, the emitted light should not be similar in characteristics to the light emitted by a typical vehicle turn indicator.

Information related to the hailing request (e.g., the desired class or cost of service, or the presence of a priority or emergency hailing request) may be encoded in the emitted light by the encoding processes 308 using various methods, including but not limited to the following individual methods, or combinations of these methods:

1. Varying the light wavelength uniformly on the display of the hailing device. For example, the display device may display a color that transitions from red to green according to a specified temporal pattern.

2. Varying the light wavelength according to specific spatial or temporal patterns on the display (e.g., distinct spatial areas of the display or the entire display may display distinct light wavelengths uniformly or in a time varying fashion). For example, a particular checkerboard image may be displayed with individual cells of the checkerboard varying in color at distinct frequencies.

3. Varying the light intensity uniformly on the entire display, or according to specific spatial or temporal patterns on the display.

Gesturing

As shown in FIG. 8, hailing of a passing autonomous vehicle may be achieved by performing a (e.g., uncommon) gesture or sequence of gestures 70 at a position and in an orientation that is likely to lie within visual line of sight of video or LIDAR sensors mounted on an autonomous vehicle (e.g., from a sidewalk or road edge, or when a potential rider is standing at an intersection). A software process 282 (FIG. 12) running on a processor 280 mounted on the autonomous vehicle would then analyze captured data from the video or LIDAR sensors to detect the presence of the gesture(s) that are intended to represent a hailing request.

The gesture(s) to be displayed may exhibit the following properties:

1. The gesture or gestures may comprise static positioning or dynamic motion of one or more of the arms or legs or both of the potential rider or other person, using positions and motions that are sufficiently different from normal limb positioning and motion to be resolved correctly by an autonomous vehicle at a nominal hailing distance using a detection system based on vision sensor(s) mounted on a vehicle and that has a typical field of view and resolution. The gesture or gestures may also comprise facial expressions which can be resolved correctly by an autonomous vehicle at a nominal hailing distance using a detection system based on vision sensor(s) mounted on a vehicle and that has a typical field of view and resolution. An example of a facial gesture is gazing continuously at a car for some minimum duration of time. The gesture can be combined with the use of a hailing device 72.

2. The appearance of the gesture or gestures should be uncommon in order to minimize the chance that a similar or identical gesture that is not being performed for the purpose of hailing an autonomous vehicle is detected by sensors on an autonomous vehicle, thereby resulting in a false detection. For example, the appearance of the gesture or gestures should not be similar to gestures used by cyclists to indicate a turn or by police or flagmen to regulate the flow of traffic.

3. A common gesture (such as waving hands or arms) may be used to hail an autonomous vehicle when combined with a secondary, visually distinctive stimulus in order to reduce false detections. One such secondary visual stimulus may be the potential rider looking at or tracking the autonomous vehicle by her head pose while executing the common gesture. A software process 282 running on a processor 280 mounted on the autonomous vehicle would then analyze captured data from the video or LIDAR sensors or both to detect the presence of both gesture and the secondary visual stimulus whose combined occurrence is intended to represent a hailing request.

Information related to the hailing request (e.g., the desired class or cost of service, or the presence of a priority or emergency hailing request) may be encoded in the gesture(s)

through various methods, including but not limited to the following individual methods, or combinations of these methods:

1. Varying particular gestures, e.g., displaying a unique gesture or sequence of gestures depending on the information related to the hailing request. For example, a particular gesture may be displayed for a hailing request by a single potential rider for an autonomous vehicle offering a standard class of service, while another particular gesture may be displayed for a hailing request by a potential rider on behalf of a party of two passengers for an autonomous vehicle offering a premium class of service.

2. Varying the sequence of gestures displayed, including varying the temporal properties of the sequence of gestures displayed. For example, a particular sequence of gestures may be displayed for a hailing request by a single potential rider for an autonomous vehicle offering a standard class of service, while another particular sequence of gestures may be displayed for a hailing request by a potential rider on behalf of a party of two passengers for an autonomous vehicle offering a premium class of service. The temporal properties such as the display duration of each gesture may be modulated to encode additional information, or reduce incidence of false detections.

Emitting Sounds

Hailing of a passing autonomous vehicle may be achieved by emitting from a hailing device (here including a smartphone or similar device, a whistle or similar device, or the potential rider using her mouth) an uncommon sound or sequence of sounds of sufficient volume that they can be detected by sensors mounted on a passing autonomous vehicle and not produce incidences of false detection. The emitting of the sound and the features and characteristics of the emitted sound can be controlled and modulated by one of the encoding or sound modulation processes 308, 312 running on a hailing device.

The emitted sound or sounds to be emitted may exhibit the following properties:

1. The sound frequency may lie within the typical human audible frequency range or, given sufficient emission capabilities of the hailing device, outside the typical human audible frequency range. Emission of a particular sound frequency depends upon by auditory sensors mounted on the passing autonomous vehicle being able to detect such a frequency.

2. The sound frequency in the typical human audible frequency range may lie in bands associated with a particular note or many notes.

3. The sound frequency may be uniform or variable.

4. The sound frequency may be controllable or uncontrollable.

5. The sound volume may be uniform or variable. The volume level should be chosen to be reliably detected by a sound measurement sensor or sensors mounted on an autonomous vehicle with a typical detection sensitivity and given a typical expected ambient noise level.

6. The sound volume may be controllable or uncontrollable.

7. The sound or sounds can be uncommon, in order to reduce the chance that a similar or identical ambient sound will be detected by sensors on an autonomous vehicle and interpreted as a hailing request, thereby resulting in a false detection. For example, the sound or sounds should not be similar in nature to common sounds such as car horns, car alarms, or emergency vehicle sirens.

Information related to the hailing request (e.g., the desired class or cost of service, or the presence of a priority or emergency hailing request) may be encoded in the emitted sound by the encoding and sound modulation processes 308, 312 using various methods, including but not limited to the following individual methods, or combinations of these methods:

1. Varying the sound frequency uniformly or according to specific temporal patterns. The pattern of sound frequencies to be emitted may be a company jingle, song, or catchphrase that conveys an advertisement or promotional information. The advertisement may be for an autonomous vehicle company (e.g., a company that manages autonomous vehicles that may respond to the hailing request) or another business entity.

2. Varying the sound volume uniformly or according to specific temporal patterns.

Direct Wireless Communication

An autonomous vehicle may be hailed using a hailing device that directly communicates wirelessly with the autonomous vehicle without the hailing request passing through the central server from the potential rider to the autonomous vehicle. The hailing device could be a mobile device or could be fixed at a particular location. The hailing device and a communication device on the autonomous vehicle both would need to support an appropriate communication technology, for example, they would both need to include transmitters, receivers, and communication software. Many existing communication technologies such as Radio Frequency (RF), Infrared (IR), WiFi, WiMax, and Bluetooth may be used or adapted for this purpose. The hailing device could broadcast the request to nearby vehicles, and once a particular autonomous vehicle has responded it can then communicate exclusively with that vehicle. In the case of a hailing device, communication process 314 can handle the communications and compliance with the appropriate protocols.

Direct wireless communication can achieved, in some examples, by use of vehicle to infrastructure (V2I) compatible protocols. In such examples, a hailing device can send a hailing request to infrastructure (using the V2I compatible protocol). The infrastructure then relays the hailing request to vehicles in the vicinity (say, within a range of 500 meters), Autonomous vehicles pick up the relayed hailing requests using their V2I-compatible receivers. This mode of hailing is direct in that no central server is involved. The infrastructure could be a wide range of devices such as WiFi access points mounted on, say, streetlights.

Combinations of Hailing Modes

Each of the various signaling modes that we have discussed can be used in combination with one or more of the other modes, and with additional modes not mentioned explicitly. Using modes in combination can reduce the incidence rate of false detections. For example, a hailing method may rely on executing a particular gesture (e.g., waving one's arm above one's head) while displaying a hailing device that is emitting a particular temporal sequence of colors. A wide range of other combinations of signaling modes would also be possible.

Fixed Hailing Device

As mentioned above, an autonomous vehicle may also be hailed by a hailing device, such as a hailing device forming part of a kiosk that is fixed at a location. This is particularly relevant, but not limited, to areas where autonomous vehicles are commonly hailed, or where there is usually a good chance of an autonomous vehicle being present nearby, or where there is high pedestrian throughput, or at autonomous vehicle stations. A hailing device in a fixed location could provide a user interface in a variety of modes, from a simple button to something more complex that includes a screen, speakers, microphone, touch-screen, or a combination of these and similar input/output components. The user interface could enable the potential rider (or someone on his behalf) to indicate a destination location, a number of riders, a class of service, a time to arrive, and a variety of other pieces of information relevant to the hailing. The hailing device at the fixed location could broadcast the hailing request to one or more nearby vehicles either by attempting to communicate directly with the one or more nearby vehicles or by communication through a central system, using appropriate wireless communication devices including receivers and transmitters for this purpose.

Processing Received Hailing Requests

Once a hailing request receiver on the autonomous vehicle (e.g. one of the communication devices 240 shown in FIG. 12) detects a hailing request communicated using one of the signaling modes and devices described above or other similar signaling modes or devices, a processor on the autonomous vehicle processes the information contained in the hailing request and, among other things, decides whether to accept the request. This decision may be made by the process running on the autonomous vehicle or by a central system to which the vehicle is connected or by a combination of the two. The decision can be based on a combination of a number of factors. These factors include, but are not limited to: the vehicle's current location, the vehicle's current speed, current traffic conditions in the surrounding area, and the vehicle's determination of its ability to come to a safe stop and pick up the passenger. Nearby autonomous vehicles may also communicate with each other using vehicle-to-vehicle (V2V) communication to ensure that multiple vehicles do not respond to the same hailing request. Communication between vehicles between for this purpose could also be achieved using a centralized system.

Communication Between an Autonomous Vehicle and a Hailing Device

Although we have described various methods for hailing an autonomous vehicle by sending a hailing request from (or on behalf of) the potential rider or from a hailing device, thereby yielding one-way communication between the potential rider and the autonomous vehicle, in some cases it may be desirable to enable two-way communication between the potential rider (or an associated hailing device) and the autonomous vehicle, for the purpose of confirming a hailing request.

To confirm a hailing request, upon detection of, for example, an image-based, light-based, auditory, gestural, or other hailing request from a potential rider, the autonomous vehicle may transmit an image-based, light-based, or auditory receipt confirmation signal, for example, with the intent that this receipt confirmation would be uniquely identifiable as a response signal by a sensor or sensors mounted on the hailing device. Upon receipt of this receipt confirmation by the hailing device, the hailing device may transmit a hailing confirmation signal to the autonomous vehicle that is different from the original hailing request. Upon receipt of this hailing confirmation by the autonomous vehicle, the autonomous vehicle would initiate a pickup sequence including stopping near the potential rider for the purpose of picking up the rider.

Exemplary signaling modes for sending a receipt confirmation include those for sending a hailing request. More specifically, such methods include but are not limited to:

1. Responding to a hailing request by display of a black-and-white, grayscale, or color image or sequence of images on a display screen mounted on (for example on the outside of) the autonomous vehicle. The image properties (e.g., geometric features, texture, and appearance) should be chosen such that they can reliably be resolved by a vision sensor or sensors mounted on the hailing device and having a typical field of view and resolution.

2. Responding to a hailing request by emitting light or sound from one or more display screen, light emitting device, light-emitting diode, siren, klaxon, or other signaling device mounted on (for example, on the exterior) of the autonomous vehicle. The light intensity should be chosen such that it can reliably be detected by a vision sensor or sensors or light detection sensor or auditory sensors mounted on the hailing device and having a typical detection sensitivity, or perceived by a potential rider.

3. Responding to a hailing request by emitting from one or more speakers mounted on (for example, on the exterior of) the vehicle a sound or sequence of sounds. The volume level should be chosen such that it can reliably be detected by a sound measurement and sensor or sensors mounted on a hailing device and having a typical detection sensitivity, or perceived by a potential rider, given a typical expected ambient noise level.

The image or images displayed, light or lights displayed, and sound or sounds emitted by the autonomous vehicle may exhibit exemplary properties that include, for example, those described above for image or images displayed, light or lights displayed, and sound or sounds emitted by the hailing device. Information may also be encoded in the image or images displayed, light or lights displayed, and sound or sounds emitted by the autonomous vehicle using, for example, the methods described above for the image or images displayed, light or lights displayed, and sound or sounds emitted by the hailing device.

Once a receipt confirmation has been received by the hailing device, the hailing device may transmit a hailing confirmation to the autonomous vehicle. Signaling modes for sending for the hailing confirmation can include those that can be employed for transmitting a hailing request. However, it may not be necessary to encode within the hailing confirmation signal information related to the hailing request (e.g., the desired class or cost of service, or the presence of a priority or emergency hailing request). As a result, the hailing confirmation signal could be simpler than the hailing request.

Communication may also be verbal through speech output (utterances) by one or more speakers mounted on the exterior of the vehicle and verbal responses (utterances) received from the potential rider through one or more microphones mounted on the autonomous vehicle. In order to do so, a processor on the autonomous vehicle may execute a speech synthesis program or dialog system contained on the vehicle, play back recorded speech, or broadcast speech received from a human remote operator connected to the vehicle via a wireless link. The volume may be chosen to be appropriate for the distance of the potential rider to the autonomous vehicle. Once a verbal response has been received by the autonomous vehicle, a speech recognizer or decoding program on the vehicle may determine whether to interpret the received voice signal as a hailing confirmation of the hailing request.

As shown in FIG. 9, in some examples of the hailing system, the process of hailing an autonomous vehicle, begins with the potential rider causing a hailing request to be sent 90 using a signaling mode offered by a hailing device or by gesturing, for example. The autonomous vehicle detects the hailing request and decodes the information embedded in it 92. A process running on the autonomous vehicle decides to accept or reject the request 94 and in doing so may communicate with a central server or other vehicles. The autonomous vehicle then sends a response to the hailing device 96 for the user using a signaling mode. The hailing device may forward the response to the user 98 by giving the user notice on a mobile device or a kiosk using sounds or visual indicators. If the autonomous vehicle accepts the request, it changes its path accordingly and stops safely near the rider 100. In some implementations, not all of the steps shown in FIG. 9 need be performed.

Other implementations are within the scope of the following claims.

The invention claimed is:

1. A method comprising:
   receiving, at an image capture device of an autonomous vehicle (AV), one or more pulses of light emitted by a display of a device at a geographic location;
   decoding, by one or more processors of the AV, the one or more pulses of light;
   identifying, by the one or more processors and based on the one or more decoded pulses of light, a request for transportation services at the geographic location;
   selecting, by the one or more processors, a stopping place at the geographic location; and
   causing, by the one or more processors, the AV to stop at the selected stopping place.

2. The method of claim 1, further comprising:
   in response to identifying the request for transportation services, sending, by the AV, a receipt confirmation to a user device.

3. The method of claim 1, wherein the pulses of light are in a near infrared spectrum.

4. The method of claim 1, wherein the request for transportation services includes a destination location.

5. The method of claim 1, wherein the request for transportation services includes a number of riders.

6. A method comprising:
   receiving, at an audio subsystem of an autonomous vehicle (AV), one or more audio signals emitted from a user device at a geographic location;
   decoding, by one or more processors of the AV, the one or more audio signals;
   identifying, by the one or more processors and based on the one or more decoded audio signals, a request for transportation services at the geographic location;
   selecting, by the one or more processors, a stopping place at the geographic location; and
   causing, by the one or more processors, the AV to stop at the selected stopping place.

7. The method of claim 6, further comprising:
   in response to identifying the request for transportation services, sending, by the AV, a receipt confirmation to the user device.

8. The method of claim 6, wherein the request for transportation services includes a destination location.

9. The method of claim 6, wherein the request for transportation services includes a number of riders.

10. One or more non-transitory computer storage media encoded with instructions that, when executed by one or more computers, cause the one or more computers to perform operations comprising:
    receiving, at an image capture device of an autonomous vehicle (AV), one or more pulses of light emitted by a display of a device at a geographic location;
    decoding, by one or more processors of the AV, the one or more pulses of light;
    identifying, by the one or more processors and based on the one or more decoded pulses of light, a request for transportation services at the geographic location;
    selecting, by the one or more processors, a stopping place at the geographic location; and
    causing, by the one or more processors, the AV to stop at the selected stopping place.

11. One or more non-transitory computer storage media encoded with instructions that, when executed by one or more computers, cause the one or more computers to perform operations comprising:
    receiving, at an audio subsystem of an autonomous vehicle (AV), one or more audio signals emitted from a user device at a geographic location;
    decoding, by one or more processors of the AV, the one or more audio signals;
    identifying, by the one or more processors and based on the one or more decoded audio signals, a request for transportation services at the geographic location;
    selecting, by the one or more processors, a stopping place at the geographic location; and
    causing, by the one or more processors, the AV to stop at the selected stopping place.

12. An apparatus comprising:
    a display screen;
    one or more processors;
    memory storing instructions that when executed by the one or more processors, cause the one or more processors to perform operations comprising:
      receiving, by the one or more processors, user input requesting transportation services;
      modulating light emitted from the display screen, the modulated light encoding the request for transportation services; and
      receiving, by the one or more processors, a message from a vehicle acknowledging the request for transportations services.

13. An apparatus comprising:
    an audio subsystem including one or more microphones and one or more loudspeakers;
    one or more processors;
    memory storing instructions that when executed by the one or more processors, cause the one or more processors to perform operations comprising:
      receiving, by the one or more microphones, speech input;
      determining, by the one or more processors, that the speech input is requesting transportation services;
      modulating audio emitted from the loudspeaker, the modulated audio encoding the request for transportation services; and
      receiving, by the one or more processors, a message from a vehicle acknowledging the request for transportations services.

* * * * *